No. 652,816.  
M. SNYDER.  
PIPE UNION.  
(Application filed Mar. 21, 1900.)  
(No Model.)  
Patented July 3, 1900.
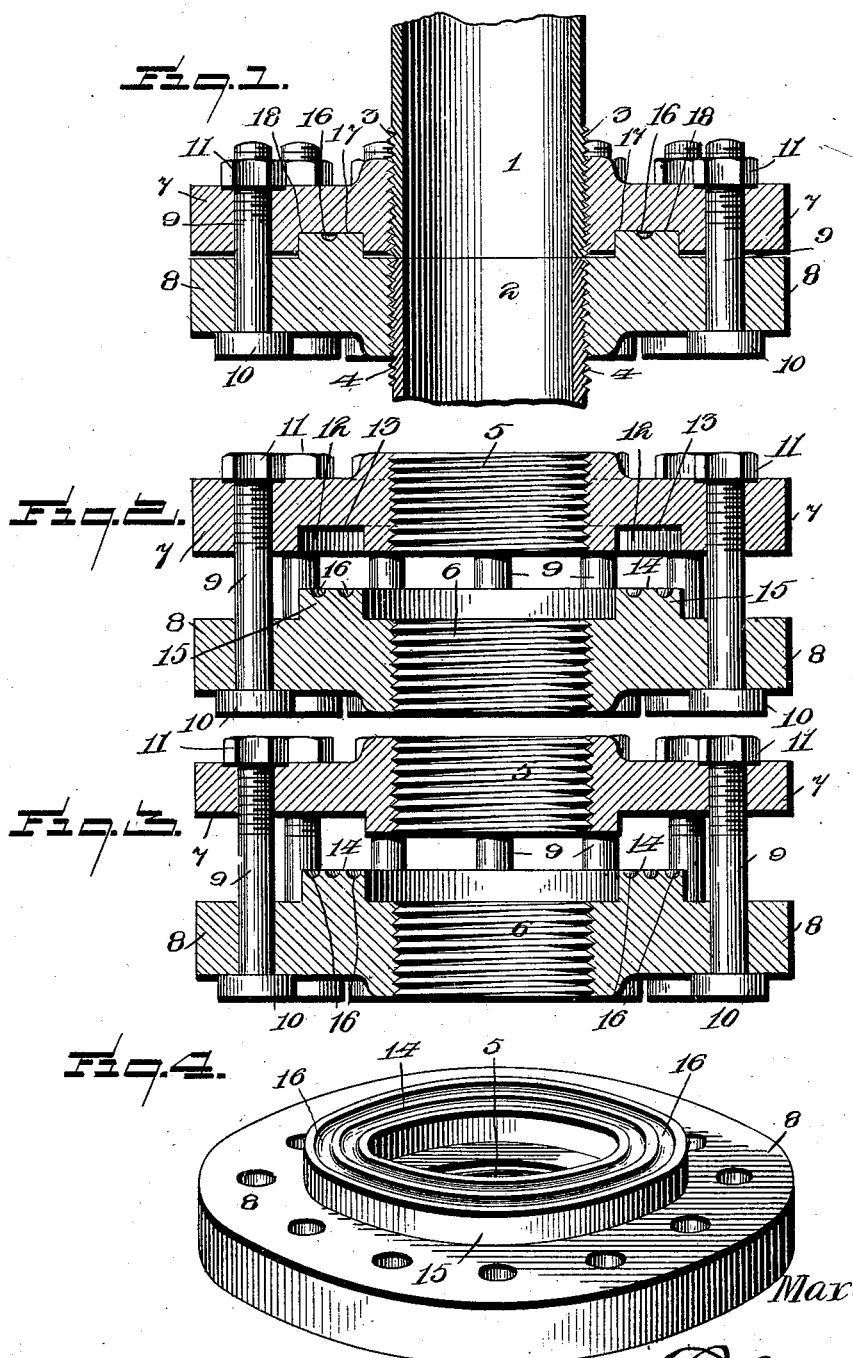
Witnesses  
Geo. A. Byrne.  
Louis G. Julihn.
Max Snyder.  
Inventor  
By E. G. Siggers  
Attorney
THE NORRIS PETERS CO., PHOTO-LITHO., WASHINGTON, D. C.

UNITED STATES PATENT OFFICE.

MAX SNYDER, OF BEATTY, PENNSYLVANIA.

PIPE-UNION.

SPECIFICATION forming part of Letters Patent No. 652,816, dated July 3, 1900.

Application filed March 21, 1900. Serial No. 9,611. (No model.)

*To all whom it may concern:*

Be it known that I, MAX SNYDER, a citizen of the United States, residing at Beatty, in the county of Westmoreland and State of Pennsylvania, have invented a new and useful Pipe-Union, of which the following is a specification.

The joining of a plurality of pipe-sections in the construction of steam or other apparatus which contemplates the conveyance of a fluid under tension necessitates the provision of means for preventing leakage at the points of connection of the pipe-sections or other individual members of the conduit. Ordinarily this end has been attained by connecting the contiguous pipe-sections by means of a pipe joint or union comprising two members having threaded connection with the pipe-sections and urged against an interposed ring of packing by suitable adjusting mechanism, ordinarily a crown of bolts. The packing referred to is objectionable, because the pressure to which it must be subjected renders it speedily ineffective and necessitates frequent replacing of the packing-ring.

My invention relates, therefore, to a novel pipe-joint, and has for its object the production of a joint or union for connecting the contiguous ends of pipe-sections without necessity for the employment of compressible packing.

To this end the invention consists in constituting the members of the joint into male and female closures by providing them, respectively, with an annular recess and a correlative annular projection, the effectiveness of which latter is increased by the formation upon its effective face of a plurality of concentric contact-faces designed for effective engagement with the bottom wall of the annular recess in the opposed member or section.

In the accompanying drawings, Figure 1 is a diametrical sectional view through one form of my pipe-joint in effective connection with the contiguous ends of two pipe-sections. Fig. 2 is a similar view of a slightly-modified form of joint, the members being out of effective engagement and the pipe-sections being removed. Fig. 3 is a view similar to Fig. 2, showing a greater number of concentric bearing-surfaces forming the face of the annular projection, which latter in this form is designed to bear against the opposed face of the contiguous member of the joint without the provision of a depression in the latter; and Fig. 4 is a perspective view of the male member of the joint shown in Fig. 2.

Referring to the numerals of reference indicating corresponding parts in the several views, 1 and 2 indicate the contiguous ends of a pair of pipe-sections intended to be connected or joined by my improved pipe-joint in a manner to prevent leakage of a fluid under pressure. Each of these sections is provided with external screw-threads 3 and 4 for engagement with the internal threads 5 and 6 of the pipe-joint members 7 and 8. As usual, the joint members are formed in cast metal of substantially-circular contour, and after being screwed upon the pipe-sections are designed to be drawn together to close the joint by means of a crown of bolts 9 piercing the members, preferably adjacent to their peripheries, and provided with heads 10 and nuts 11, bearing, respectively, upon the outer faces of said members. As thus far described the joint is substantially of ordinary construction, a ring of fibrous or other compressible packing being ordinarily interposed between the joint members, as heretofore suggested. In carrying out my invention I provide in the inner face of the section 7 an annular groove or depression 12, whose bottom wall 13 is carefully trued and forms an effective bearing-surface or contact-face for engagement with the opposed effective face 14 of a correlative annular projection 15, extending from the opposed face of the member 8. This arrangement of interfitting parts constitutes the members 7 and 8, female and male members, respectively, and they will be designated by these terms for the purpose of succinct definition in the appended claims.

I have found in practice that the joint is rendered more effective and its life as a secure closure is prolonged by providing the effective faces 14 of the male members with a plurality of bearings or contact-surfaces. The reason for this is that in the event of slight marring of one of the surfaces the integrity of the others is not necessarily impaired and the effectiveness of the joint will therefore be maintained in instances where it would otherwise permit leakage of a fluid under tension.

In Fig. 1 of the drawings I have shown a medial annular groove or depression 16 in the effective face 14 of the annular projection, defining a plurality of annular bearing or contact faces 17 and 18. In Fig. 2 I show two depressions, defining three concentric annular bearing-surfaces located, respectively, at each edge and at the middle of the face 14, and in Fig. 3 I show a still greater number of depressions, defining four concentric annular contact-faces, the total surface area of all of which is less than the area of the intermediate depressions.

It will be observed that in practice the joint members are screwed upon contiguous sections of pipe and are drawn together with considerable force by the screwing up of the nuts 11 of the bolts 9, the approach of the members effecting the interfitting of the projections 15 with the depressions 12, causing the effective faces 13 and 14 to contact, and thereby preventing the escape of steam or other fluid from the conduit, of which the pipe-sections constitute component parts.

While I have described my invention as applicable to pipe-joints, I do not desire to be understood as limiting myself to its use in that connection, as it is obvious that the formation of a fluid-tight joint could be effected in various connections in accordance with the spirit of my invention—as, for instance, in valve, trap, or other constructions comprehending a plurality of members designed to be connected in a manner to prevent the escape of contained fluid.

If desired, a viscous seal—as, for instance, white lead or its equivalent—may be deposited in the annular grooves or depressions 16 prior to the drawing up of the joint, but ordinarily this will be entirely unnecessary.

What I claim is—

1. A joint comprehending two members provided, respectively, with a depression and a projection, the opposed faces of the depression and projection constituting bearing-faces, one of which is formed with a series of separated contact-surfaces and the other of which is located in the same plane throughout.

2. A packingless joint comprising two members one of which is provided with a bearing-surface lying in the same plane throughout, and the other of which is formed with a bearing-surface composed of a series of separate contact-faces located in the same plane and arranged for engagement with the bearing-surface of the other member, said bearing-surfaces, when in contact, being located in a plane removed from, but parallel with, the plane of the opposed faces of the members.

3. In a joint, the combination with a female member provided with an annular depression having its entire bottom wall located in the same plane, of a male member provided with an annular projection having a series of separated contact-surfaces opposed to the bottom wall of the depression in the other member, and means for drawing the members into effective contact.

In testimony that I claim the foregoing as my own I have hereto affixed my signature in the presence of two witnesses.

MAX SNYDER.

Witnesses:
J. M. STERLING,
MARK BAUER.